(12) United States Patent
Lee

(10) Patent No.: US 6,909,605 B2
(45) Date of Patent: Jun. 21, 2005

(54) OPTICAL COMMUNICATION BOARDS INCLUDING POWER CONTROL FUNCTION AND SYSTEM HAVING THE BOARDS

(75) Inventor: Jong-Hwa Lee, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 10/673,872

(22) Filed: Sep. 30, 2003

(65) Prior Publication Data

US 2004/0076438 A1 Apr. 22, 2004

(30) Foreign Application Priority Data

Oct. 22, 2002 (KR) ................................ 10-2002-0064640

(51) Int. Cl.$^7$ ................................................. H05K 7/20
(52) U.S. Cl. ........................ 361/695; 361/796; 370/217
(58) Field of Search ................................ 361/728–730, 361/747, 752, 753, 796, 687–688; 385/134–136; 370/217; 165/80.3; 312/236

(56) References Cited

U.S. PATENT DOCUMENTS

| | | | |
|---|---|---|---|
| 5,596,569 A | 1/1997 | Madonna et al. | 370/217 |
| 6,025,989 A | 2/2000 | Ayd et al. | 361/695 |
| 6,359,789 B1 * | 3/2002 | Imabayashi et al. | 361/796 |
| 6,388,879 B1 * | 5/2002 | Otaguro et al. | 361/695 |
| 6,606,253 B2 | 8/2003 | Jackson et al. | 361/796 |
| 6,671,178 B2 * | 12/2003 | Boyer et al. | 361/724 |

* cited by examiner

*Primary Examiner*—Hung Van Duong
(74) *Attorney, Agent, or Firm*—Robert E. Bushnell, Esq.

(57) ABSTRACT

According to one aspect of the present invention, the present invention provides an optical communication system, including: racks mounting many optical communication boards having optical modules thereon, and supplying system power to the mounted optical communication boards; a remote control line supplying a power supplying control signal to the optical communication boards mounted on the optional racks; optical communication boards receiving the system power by being mounted on the racks, and selectively supplying the supplied system power to the optical modules according to the power supplying control signal supplied through the remote control line; and a remote controller preventing the system power from being supplied to the optical modules when the optical communication boards are mounted on the racks while the system power is applied to the racks, and outputting the power to the corresponding optical modules through the remote control line in order to supply the power to the corresponding optical modules when the system power is stable at predetermined level by being applied to the optical communication boards. Therefore, it can prevent the optical modules from being damaged by the system power when the optical communication boards are mounted on the optical communication system.

20 Claims, 4 Drawing Sheets

OPTICAL COMMUNICATION BOARDS INCLUDING POWER CONTROL FUNCTION AND SYSTEM HAVING THE BOARDS

CLAIM OF PRIORITY

This application makes reference to, incorporates the same herein, and claims all benefits accruing under 35 U.S.C. §119 from an application for OPTICAL COMMUNICATION BOARD HAVING POWER CONTROL FUNCTION AND SYSTEM HAVING THE BOARD earlier filed in the Korean Intellectual Property Office on 22 Oct. 2002 and there duly assigned Serial No. 2002-64640.

BACKGROUND OF THE INVENTION

1. Field of the Invention

The present invention generally relates to optical communication boards having a power control function and a system having the boards.

2. Description of the Related Art

Recently, as the Internet and data for communication have been widely used, high capacity optical modules for optical communication have become very important in a communication system. Thus, if the optical modules are damaged, a considerable amount of data loss and a communication failure will cause entire industrial loss.

As a result, a method for maintaining performance of the optical modules has been developing.

Particularly, it is essential to satisfy various requirements in order to regularly supply power necessary for the optical modules and normally operate the optical modules.

Optical communication boards are mounted on system racks. Optical communication boards are mounted according to functions necessary for various system racks. The optical communication boards are composed of optical modules and power converters applied with system power to convert the applied power into power necessary for the optical modules and apply the power to the optical modules.

Like the above, if the optical communication boards are mounted on one system, the same power is applied by rack units, and the power is converted into power necessary for each module by the power converters installed in each optical communication board, then the power is supplied to each module.

When the system power is applied while the optical communication boards are mounted on the system, a power flow chart up to the optical modules will be described as follows.

First, when the system power is on, power is applied to the system. The power applied to the system is applied to each optical communication board. The system power applied to the optical communication boards is converted into necessary power by each power converter, and the converted power by the power converters is applied to each optical module.

In the meantime, when an optional optical communication board is mounted on the system after applying the system power, a power flow chart up to the optical modules will be described as follows. The same power with rack units is already supplied before mounting each optical communication board. When the optical communication boards are mounted, the converted power is applied to the optical modules of the optical communication boards simultaneously.

In such a case of the earlier art, since power is already supplied to the entire racks before mounting the optical communication boards on the racks, power is applied to each module of the optical communication boards at the same time when the optical communication boards are mounted. Thus, the optical modules for optical communication can be damaged by an electric shock due to sudden power applying, and a high voltage current can damage the modules when the optical modules are not normally operated.

SUMMARY OF THE INVENTION

It is therefore an object of the present invention to provide optical communication boards having a power control function and a system having the boards for maintaining performance of optical modules by preventing the optical modules for optical communication from being damaged owing to an electric shock or differences from normal operation requirements caused when power is applied to each optical module of the optical communication boards, as soon as the optical communication boards are mounted when power is supplied to entire racks.

It is another object to provide stable power to optical communication modules when a power applying control signal is generated by a remote controller.

It is yet another object to efficiently prevent optical modules for optical communication from being electrically damaged from sudden application of power.

To accomplish the above and other objects, according to one aspect of the present invention, the present invention provides optical communication boards detachably mounted on racks of an optional optical communication system. The optical communication boards include: optical modules for performing optical communication; a plurality of power converters converting the system power into necessary power to be supplied to the optical modules; and a power controller performing a switching process to supply the power supplied through the power converters to the optical modules according to a power supplying control signal supplied through the racks of the optical communication system, while preventing the power supplied from the power converters from being supplied to the optical modules when mounted on the racks of the optical communication system.

In addition, according to another aspect of the present invention, an optical communication system includes: racks mounting optional boards, and supplying system power to the mounted boards; a remote control line supplying a power supplying control signal to the optional boards mounted on the racks; optical communication boards having optical modules, receiving the system power by being mounted on the racks, and selectively supplying the supplied system power to the optical modules according to the power supplying control signal supplied through the remote control line; and a remote controller outputting the power supplying control signal to the optical communication boards through the remote control line in order to prevent the system power from being supplied to the optical modules when the optical communication boards are mounted on the racks while the system power is applied to the racks, and to supply the power to the corresponding optical modules when the system power is stable at predetermined level by being applied to the optical communication boards.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
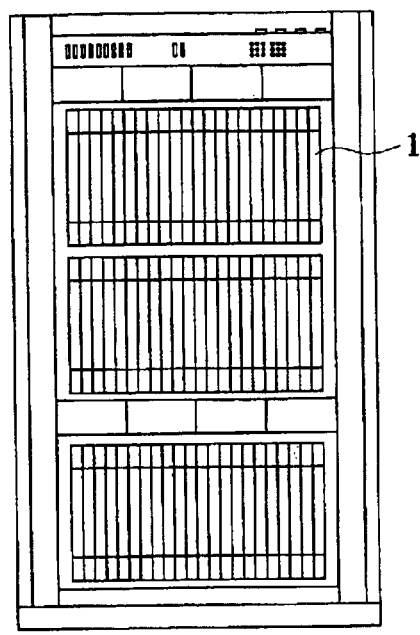
FIG. 1 is a diagram illustrating optional racks mounting many boards thereon in a prior optical communication system.
Figure 2:
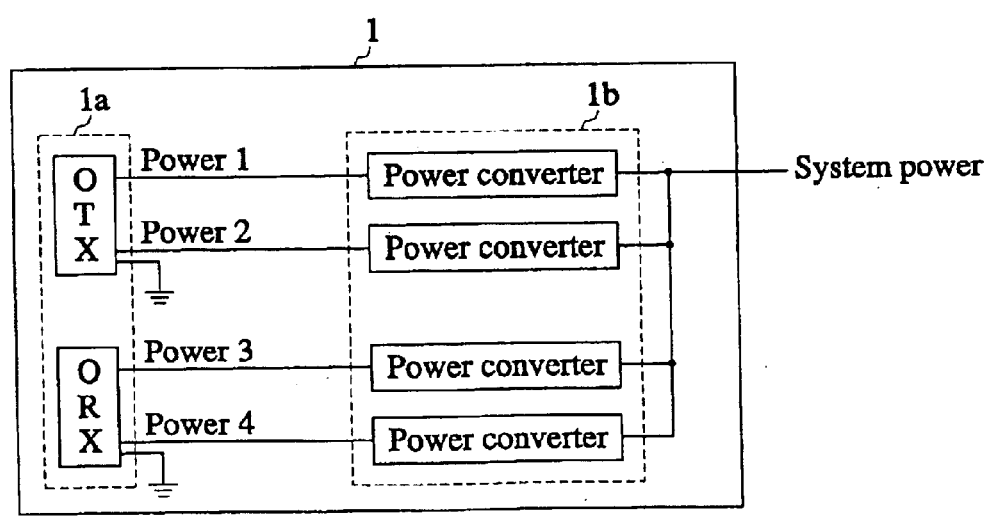
FIG. 2 is an internal format block diagram of optical communication boards mounted on the racks of FIG. 1.

Turning now to the drawings, FIG. 1 illustrates that optical communication boards are mounted on system racks. As shown in FIG. 1, optical communication boards (1) are mounted according to functions necessary for various system racks. FIG. 2 is an internal format diagram of the optical communication boards illustrated in FIG. 1. Referring to FIG. 2, the optical communication boards are composed of optical modules (1a) and power converters (1b) applied with system power to convert the applied power into power necessary for the optical modules (1a) and apply the converted power to the optical modules (1a).

Like above, if the optical communication boards are mounted on one system, the same power is applied by rack units, and the power is converted into power (power 1, power 2 and power 3, power 4) necessary for each module (OTX, ORX) (1a) by the power converters (1b) installed in each optical communication board (1), then the power is supplied to each module (1a).

When the system power is applied while the optical communication boards (1) are mounted on the system, a power flow chart up to the optical modules will be described as follows.

First, when the system power is on, power is applied to the system. The power applied to the system is applied to each optical communication board (1). The system power applied to the optical communication boards (1) is converted into necessary power by each power converter (1b), and the converted power by the power converters (1b) is applied to each optical module (1a).

In the meantime, when an optional optical communication board is mounted on the system after applying the system power, a power flow chart up to the optical modules will be described as follows. The same power with rack units is already supplied before mounting each optical communication board. When the optical communication boards (1) are mounted, the converted power is applied to the optical modules (1a) of the optical communication boards (1) simultaneously.

In such a case of the earlier art, since power is already supplied to the entire racks before mounting the optical communication boards on the racks, power is applied to each module of the optical communication boards at the same time when the optical communication boards are mounted. Thus, the optical modules for optical communication can be damaged by an electric shock due to sudden power applying, and a high voltage current can damage the modules when the optical modules are not normally operated.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. It will also be understood that when a layer is referred to as being "on" another layer or substrate, it can be directly on the other layer or substrate or intervention layers may be also be present. Moreover, each embodiment described and illustrated herein includes its complementary conductivity type embodiment as well.

Hereinafter, the present invention will be described in detail in reference to the accompanying drawings.

Figure 3:
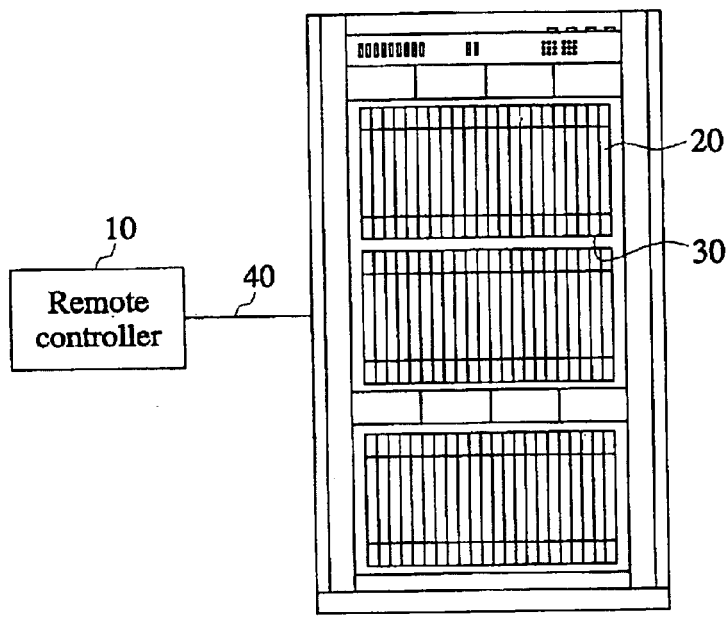
FIG. 3 is a format block diagram of an optical communication system in accordance with one aspect of the present invention.

FIG. 3 is a format diagram of an optical communication system in accordance with one aspect of the present invention.

Referring to FIG. 3, the optical communication system by the one aspect of the present invention includes a remote controller (10), optical communication boards (20), racks (30) mounting the optical communication boards (20) on the system, and a remote control line (40) supplying a power supplying control signal to the optical communication boards (20).

The remote controller (10) prevents system power from being supplied to optical modules when the optical communication boards (20) are mounted on the racks (30) while the system power is applied to the racks (30), and outputs the power supplying control signal to the optical communication boards (20) through the remote control line (40) in order to supply the power to the corresponding optical modules while the system power is stable at predetermined level by being applied to the optical communication boards (20). The remote controller (10) can be implemented by a control PC (personal computer) of an operator (operator control terminal).

The optical communication boards(20) having the optical modules receive the system power by being mounted on the racks, and selectively supply the supplied system power to the optical modules according to the power supplying control signal supplied through the remote control line (40).

The racks (30) mount the optical communication boards (20) having the optical modules thereon, and supply the system power to the mounted optical communication boards (20).

The remote control line (40) supplies the power supplying control signal to the optical communication boards (20) mounted on the optional racks (30). That is, the remote controller (10) is interfaced with the optical communication boards (20) mounted on the racks to transmit the control signal. To do this, remote control line terminals for connecting the remote control line (40) should be installed on the racks.

Figure 4:
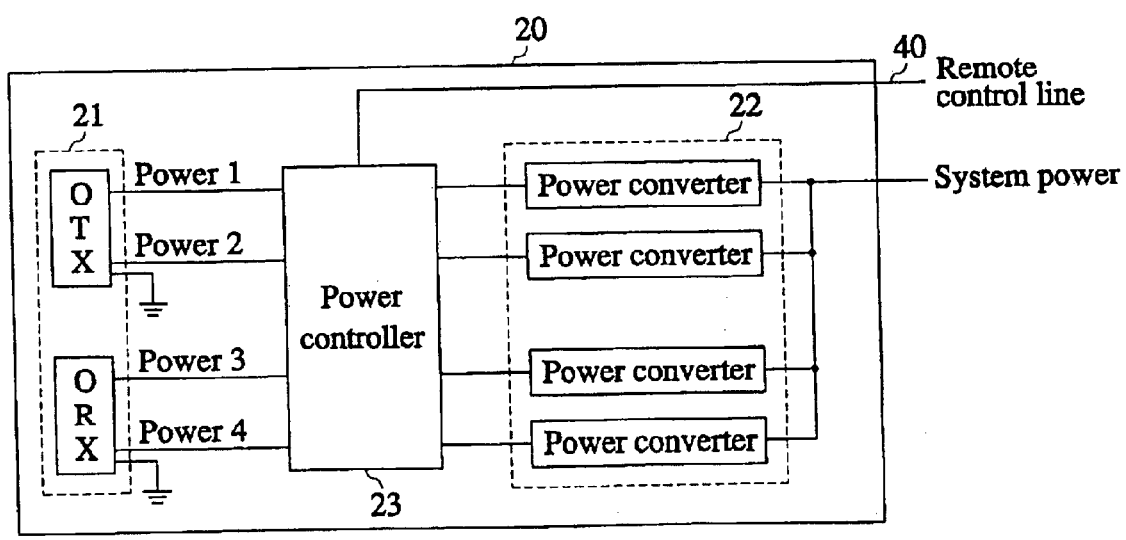
FIG. 4 is an internal format block diagram of optical communication boards mounted on the racks of FIG. 3.

FIG. 4 is an internal format diagram of the optical communication boards (20) mounted on the racks (30) of FIG. 3.

Referring to FIG. 4, the optical communication boards (20) include: optical modules (21) for performing optical communication; many power converters (22) receiving system power, and converting the system power necessary power to be supplied to the optical modules (21); and a power controller (23) performing a switching process to supply the power supplied through the power converters (22) to the optical modules (21) according to a power supplying control signal supplied through the racks (30) of an optical communication system, while preventing the power supplied from the power converters (22) from being supplied to the optical modules (21) when mounted on the racks of the optical communication system.

As system power −48V (volts) is applied, the power converters(22) convert the system power into power necessary for the optical modules(21). For instance, there are 5V, 3.3V, 15V, and 8V power.

The power controller (23) selectively applies the power converted by the power converters (22) to the optical modules (21). In another words, when the optical communication boards (20) are mounted on the racks (30), the power controller prevents the power from being applied, and when the power converted by the power converters (22) is stable at a predetermined level, the power controller applies the corresponding power at last if a power applying control signal is received from a remote controller (10).

If the optical communication boards are mounted on the racks (30) of the system while power is supplied to the entire racks, the power is applied to each power converter (22) at the same time. The power converted by the power converters (22) is applied up to the power controller (23). At this time, the converted power 1, 2, 3, and 4 are not applied to the optical modules (21, OTX, ORX) of the optical communication boards (20) mounted on the system. Meanwhile, when the power applying control signal is transmitted to the optical modules 'OTX' and 'ORX' from the remote controller (10), the power 1, 2, 3, and 4 are applied to the optical modules (21) at last.

When dismounting optical communication boards while operating the system, the above operation is inversely performed.

Figure 5:
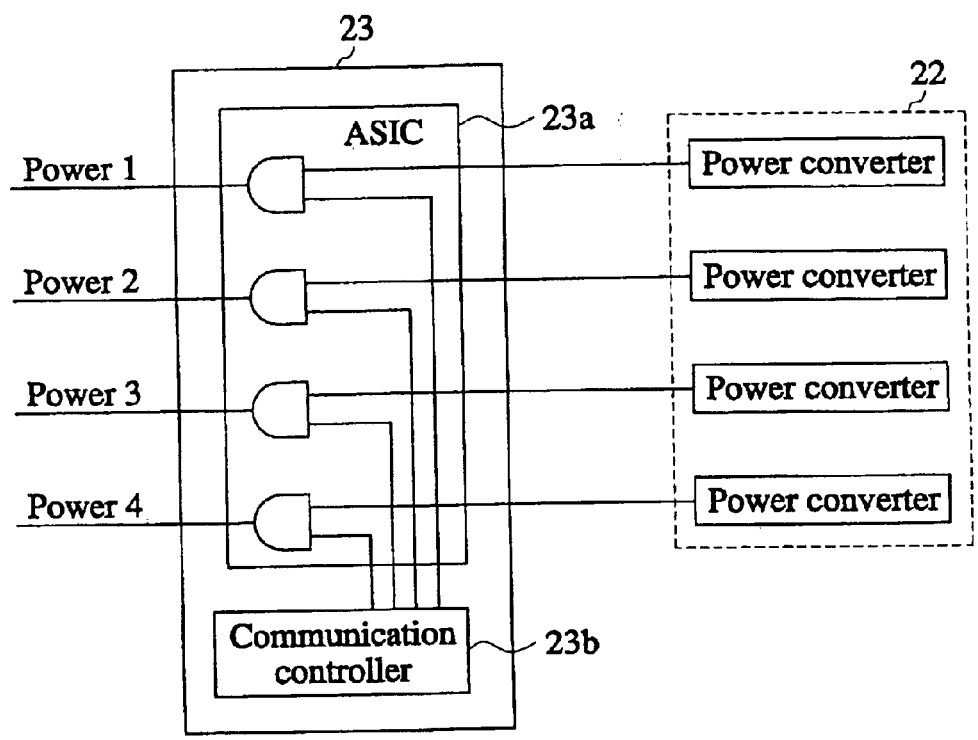
FIG. 5 is an internal format block diagram of a power controller of FIG. 4.

FIG. 5 is an internal format block diagram of the power controller of FIG. 4.

As described in FIG. 5, the power controller (23) includes: a switching unit (23a) performing a switching process to selectively supply power supplied from each power converter (22) to optical modules (21); and a communication controller (23b) performing communication with a remote controller (10) through a remote control line (40), and supplying a switching control signal for controlling opening/closing of the switching unit (23a) to the switching unit (23a).

The switching unit (23a) can be implemented by an ASIC (Application Specific Integrated Circuit). For example, it can be implemented with the use of many AND gates as shown in FIG. 5. In such a case, when a high signal is inputted from the power converters (22), corresponding power is transmitted to the optical modules (21) if a control value inputted through the communication controller (23b) is high. However, if the control value is low, the power is not supplied to the optical modules (21).

The communication controller (23b) converts a serial signal for remote control transmitted through the remote control line (40) into a parallel signal by using RS-232C protocol, and transmits the parallel signal to the switching unit (23a) composed of the ASIC.

Figure 6:
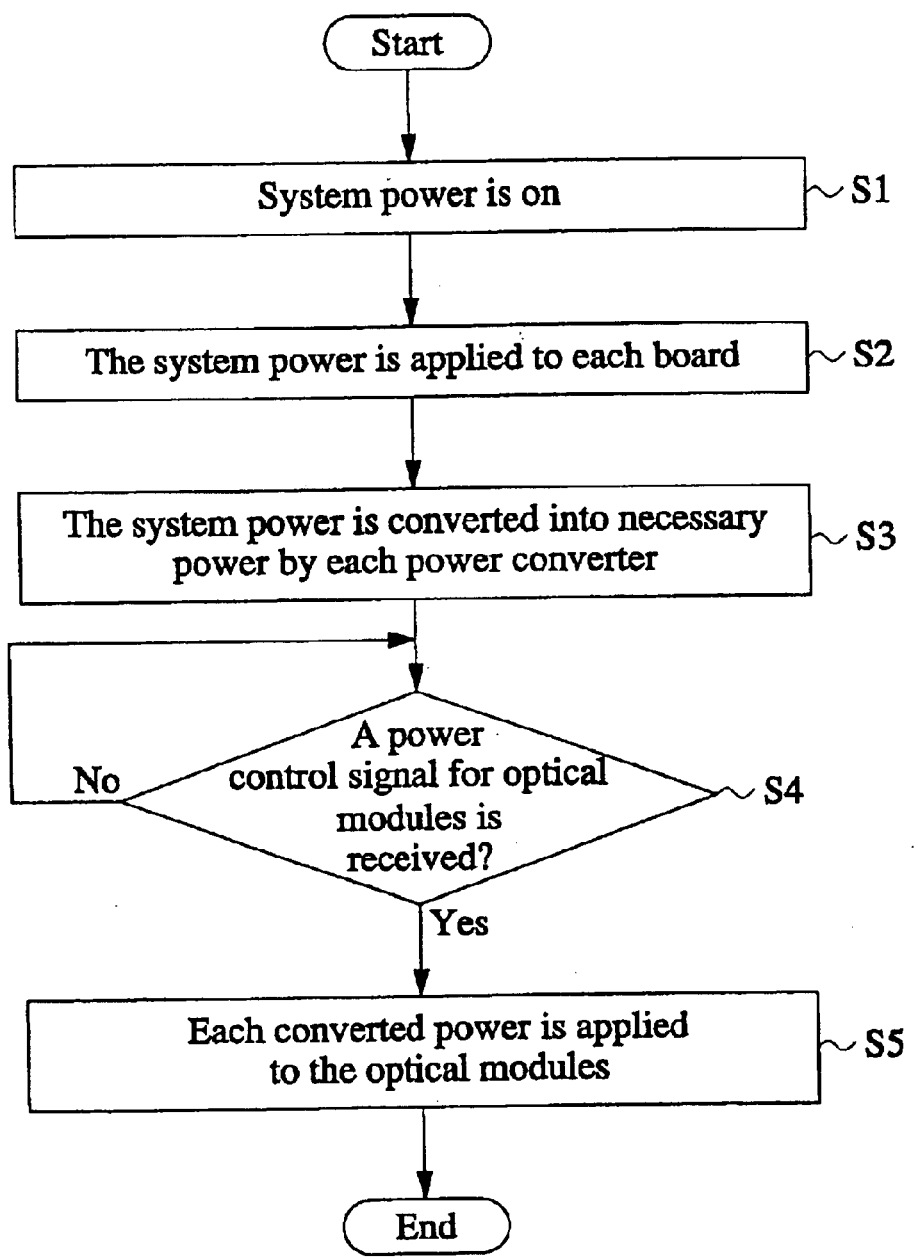
FIG. 6 is a power flow chart up to optical modules when system power is applied while optical communication boards in accordance with the present invention are mounted on a system.

FIG. 6 is a power flow chart up to optical modules when system power is applied while optical communication boards in accordance with the present invention are mounted on a system.

Referring to FIG. 6, when the system power is turned on as described (S1), the system power is applied to each optical communication board mounted on the system (S2). The power is converted into necessary power by corresponding power converters according to each optical communication board (S3). In the meantime, it is decided whether a control signal for supplying power to the optical modules is received from an operator control terminal (S4). If the control signal is received, the converted power is applied to the corresponding optical modules (S5).

On the other hand, a power flow chart up to the optical modules when each board is mounted on the system while the system power is turned on will be described as follows. Optional optical communication boards (20) are mounted on racks (30) between the step 1 (S1) and the step 2 (S2) in FIG. 6. If the optional optical communication boards (20) are mounted while the power is applied to the system, the system power is applied to each optical communication board (20), and is converted into necessary power by power converters (22) installed in each optical communication board (20). If a power control signal for supplying power to the optical modules (21) is received while the power is converted into the necessary power in the power converters (22), the converted power is applied to the optical modules (21) at last.

According to the present invention, when optional optical communication boards are mounted on racks of a system, though system power is applied to the optical communication boards, power converted by power converters installed in the optical communication boards is partially cut off by a power controller, and a stable power is applied to the optical communication modules when a power applying control signal is generated by a remote controller. Therefore, it can prevent the optical modules for optical communication from being damaged owing to an electric shock caused by sudden power applying.

What is claimed is:

1. In optical communication boards detachable or mountable on racks of an optional optical communication system, the optical communication boards including a power control function, comprising:

optical modules for performing optical communication;

a plurality of power converters converting system power into necessary power to be supplied to the optical modules; and a power controller performing a switching process to supply the power supplied through the power converters to the optical modules according to a power supplying control signal supplied through the racks of the optical communication system, while preventing the power supplied from the power converters from being supplied to the optical modules when mounted on the racks of the optical communication system.

2. The optical communication boards of claim 1, wherein the power controller comprises:

a switching unit performing a switching process to selectively supply the power supplied from each power converter to the optical modules; and a communication controller performing communication with an operator terminal through a remote control line, and supplying a switching control signal for controlling opening and closing of the switching unit to the switching unit.

3. The optical communication boards of claim 2, wherein the switching unit is implemented by an application specific integrated circuit.

4. An optical communication system, comprising:
   racks mounting optional boards thereon, and supplying system power to the mounted boards;
   a remote control line remotely supplying a power supplying control signal to the optional boards mounted on the racks;
   optical communication boards including optical modules, receiving the system power by being mounted on the racks, and selectively supplying the supplied system power to the optical modules according to the power supplying control signal supplied through the remote control line; and
   a remote controller outputting the power supplying control signal to the optical communication boards through the remote control line in order to prevent the system power from being supplied to the optical modules when the optical communication boards are mounted on the racks while the system power is applied to the racks, and to supply the power to the corresponding optical modules when the system power is stable at a predetermined level by being applied to the optical communication boards.

5. The optical communication system of claim 4, wherein the optical communication boards comprise:
   optical modules for performing optical communication;
   a plurality of power converters converting system power into necessary power to be supplied to the optical modules; and
   a power controller performing a switching process to supply the power supplied through the power converters to the optical modules according to a power supplying control signal supplied through racks of the optical communication system, while preventing the power supplied from the power converters from being supplied to the optical modules when mounted on the racks of the optical communication system.

6. The optical communication system of claim 5, wherein the power controller comprises:
   a switching unit performing a switching process to selectively supply the power supplied from each power converter to the optical modules; and
   a communication controller performing communication with an operator terminal through a remote control line, and supplying a switching control signal for controlling opening and closing of the switching unit to the switching unit.

7. The optical communication system of claim 5, wherein the power controller comprises:
   a switching unit performing a switching process to selectively supply the power supplied from each power converter to the optical modules.

8. The optical communication system of claim 5, wherein the power controller comprises:
   a communication controller performing communication with an operator terminal through a remote control line, and supplying a switching control signal for controlling opening and closing of the power controller.

9. The optical communication system of claim 6, wherein the switching unit is implemented to an application specific integrated circuit.

10. The optical communication system of claim 9, with the application specific integrated circuit, when a high signal is inputted from the power converters, corresponding power is transmitted to the optical modules when a control value inputted through the communication controller is high, and when the control value is low, the power is not supplied to the optical modules.

11. The optical communication system of claim 9, with the application specific integrated circuit comprising a plurality of AND gates, when a high signal is inputted from the power converters, corresponding power is transmitted to the optical modules when a control value inputted through the communication controller is high, and when the control value is low, the power is not supplied to the optical modules.

12. A method of an optical communication system, comprising:
   applying the system power to each optical communication board mounted on the system when the system power is turned on;
   converting the system power into necessary power by corresponding power converters according to each optical communication board;
   determining whether a control signal for supplying power to the optical modules is received from an operator control terminal; and
   applying the converted power to the corresponding optical modules when the control signal is received.

13. The method of claim 12, further comprising:
   applying the system power to each optical communication board when an optional optical communication board is mounted while the power is applied to the system, and the system power is converted into necessary power by power converters installed in each optical communication board; and
   applying the converted power to the optical modules when a power control signal for supplying power to the optical modules is received while the power is converted into the necessary power in the power converters.

14. The method of claim 13, with the mounting of the optional optical communication board being on racks of the optical communication system after system power is turned on.

15. A method of an optical communication system, comprising:
   mounting optional boards on racks, and supplying system power to the mounted boards;
   remotely supplying a power supplying control signal to the optional boards mounted on the racks through a remote control line;
   receiving, by optical communication boards including optical modules, the system power by being mounted on the racks;
   selectively supplying the supplied system power to the optical modules according to the power supplying control signal supplied through the remote control line;
   outputting, by a remote controller, the power supplying control signal to the optical communication boards through the remote control line in order to prevent the system power from being supplied to the optical modules when the optical communication boards are mounted on the racks while the system power is applied to the racks; and
   supplying the power to the corresponding optical modules when the system power is stable at a predetermined level by being applied to the optical communication boards.

16. The method of claim 15, wherein a method of the optical communication boards comprise:

performing optical communication by optical modules;

converting system power into necessary power to be supplied to the optical modules by a plurality of power converters; and performing, by a power controller, a switching process to supply the power supplied through the power converters to the optical modules according to a power supplying control signal supplied through racks of the optical communication system, while preventing the power supplied from the power converters from being supplied to the optical modules when mounted on the racks of the optical communication system.

17. The method of claim 16, wherein a method of the power controller comprises:

performing, by a switching unit, a switching process to selectively supply the power supplied from each power converter to the optical modules; and performing, by a communication controller, communication with an operator terminal through a remote control line, and supplying a switching control signal for controlling opening and closing of the switching unit to the switching unit.

18. An apparatus, comprising:

an optical module performing optical communication;

a power converter converting system power into necessary power to be supplied to the optical module; and a power controller performing a switching process to supply the power supplied through the power converter to the optical module according to a power supplying control signal supplied while preventing the power supplied from the power converters from being supplied to the optical module when mounted on the racks of an optical communication system.

19. The apparatus of claim 18, with the power controller comprising:

a switching unit selectively supply the power supplied from each power converter to the optical module; and a communication controller performing communication with an operator terminal through a remote control line, and supplying a switching control signal controlling opening and closing of the switching unit to the switching unit.

20. The optical communication boards of claim 19, further comprising a remote controller outputting the power supplying control signal through the remote control line in order to prevent the system power from being supplied to the optical module when mounting on the racks while the system power is applied to the racks, and to supply the power to the corresponding optical module when the system power is stable at a predetermined level.

* * * * *